United States Patent [19]
Lu et al.

[11] Patent Number: 5,887,256
[45] Date of Patent: Mar. 23, 1999

[54] HYBRID CELLULAR COMMUNICATION APPARATUS AND METHOD

[75] Inventors: Priscilla Marilyn Lu, San Carlos; Timothy Richard White, Palo Alto, both of Calif.

[73] Assignee: Interwave Communications International, Ltd., Hamilton, Bermuda

[21] Appl. No.: 729,546

[22] Filed: Oct. 11, 1996

Related U.S. Application Data

[60] Provisional application No. 60/006,589 Nov. 10, 1995.

[63] Continuation-in-part of Ser. No. 435,709, May 4, 1995, Pat. No. 5,734,699.

[51] Int. Cl.⁶ .............................. H04M 11/00; H04Q 7/24
[52] U.S. Cl. ............................................. 455/426; 455/435
[58] Field of Search .................................... 455/403, 414, 455/422, 426, 428, 435, 445; 370/328, 337, 338

[56] References Cited

U.S. PATENT DOCUMENTS

| | | | |
|---|---|---|---|
| 4,726,014 | 2/1988 | Goldman et al. | 370/328 |
| 5,157,709 | 10/1992 | Ohteru | 455/465 |
| 5,386,466 | 1/1995 | Bales et al. | 379/220 |
| 5,442,633 | 8/1995 | Perkins et al. | 370/331 |
| 5,479,483 | 12/1995 | Furuya et al. | 455/433 |
| 5,504,804 | 4/1996 | Widmark et al. | 455/414 |
| 5,506,837 | 4/1996 | Söllner et al. | 370/296 |
| 5,506,887 | 4/1996 | Emery et al. | 455/461 |
| 5,512,884 | 4/1996 | Hesse et al. | 455/509 |
| 5,528,664 | 6/1996 | Slekys et al. | 455/452 |
| 5,528,668 | 6/1996 | Aihara | 455/422 |
| 5,577,031 | 11/1996 | Smith | 370/329 |

FOREIGN PATENT DOCUMENTS

| | | |
|---|---|---|
| 462 727 A2 | 12/1991 | European Pat. Off. .......... H04Q 7/04 |
| 462 728 A2 | 12/1991 | European Pat. Off. .......... H04Q 7/04 |
| 566 407 A2 | 10/1993 | European Pat. Off. .......... H04Q 7/04 |
| 587 211 A2 | 3/1994 | European Pat. Off. .......... H04Q 7/04 |
| 595 392 A1 | 5/1994 | European Pat. Off. .......... H04Q 7/04 |
| 600 681 A1 | 6/1994 | European Pat. Off. .......... H04Q 7/26 |
| 605 086 A1 | 7/1994 | European Pat. Off. .......... H04Q 7/04 |
| 605 311 A1 | 7/1994 | European Pat. Off. .......... H04Q 7/26 |
| WO 94/26073 | 11/1994 | European Pat. Off. .......... H04Q 7/04 |
| WO 95/24789 | 9/1995 | European Pat. Off. . |
| WO 93/11625 | 6/1993 | WIPO .......................... H94M 11/00 |
| WO 94/05126 | 3/1994 | WIPO .......................... H04Q 7/04 |

OTHER PUBLICATIONS

J.B. Hollis, "Air Interface, Protocols for a National Mobile Data Network," IEE Collq. (1993) No. 003: Cordless Computing –Systems and User Experience, pp. 1–5.

*Primary Examiner*—Willis R. Wolfe, Jr.
*Attorney, Agent, or Firm*—Beyer & Weaver, LLP

[57] ABSTRACT

A method for facilitating cellular communication for and among a plurality of native cellular handsets in a hybrid cellular communication network that has a cellular exchange subsystem and a private mobile-services switching center. In this embodiment, the cellular exchange subsystem is coupled to a public cellular , and the native cellular handsets represent handsets that subscribe to the hybrid cellular communication network. The hybrid cellular communication network further facilitates cellular communication between a nonnative cellular handset and the public cellular network, with the nonnative cellular handset being a cellular handset that does not subscribe to the hybrid cellular communication network. In this embodiment, the method includes the steps of receiving access request data, using a cellular exchange subsystem, and ascertaining whether the access request data originates from one of the plurality of native cellular handsets or from the nonnative cellular handset. If the access request data originates from the one of the plurality of native cellular handsets, the method then passes data relating to the access request to the private mobile-services switching center for completing a first call path from the one of the plurality of native cellular handsets. On the other hand, if the access request data originates from the nonnative cellular handset, the method passes data relating to the access request data to the public cellular network for completing a second call path between the nonnative cellular handset and the public cellular network.

21 Claims, 11 Drawing Sheets

| IMSI | Phone # | Name | SS# | Home Loc | Current Loc | Supplemental Services Settings |
|---|---|---|---|---|---|---|
| 0,000,000,001 | 123-6020 | John | 123-45-6789 | CPBX #1 | Not Available | |
| 0,000,000,002 | 123-6021 | Janet | 123-45-6788 | CPBX #1 | CPBX #1 | |
| 0,000,000,003 | 123-6022 | Jack | 123-45-6787 | CPBX #1 | CPBX #2 | |
| | | | | | | ⋮ |

Figure 5

Fig. 8
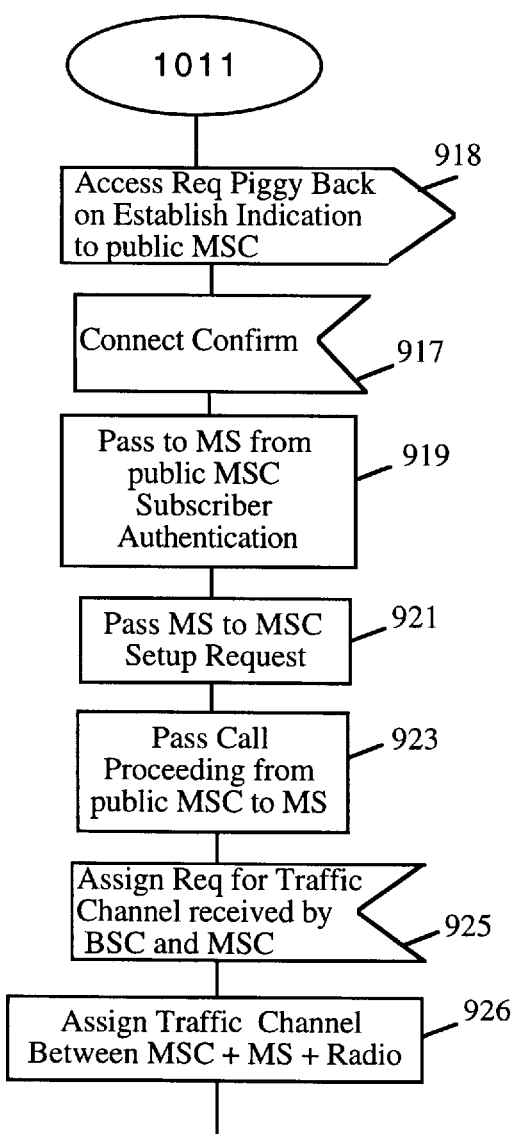
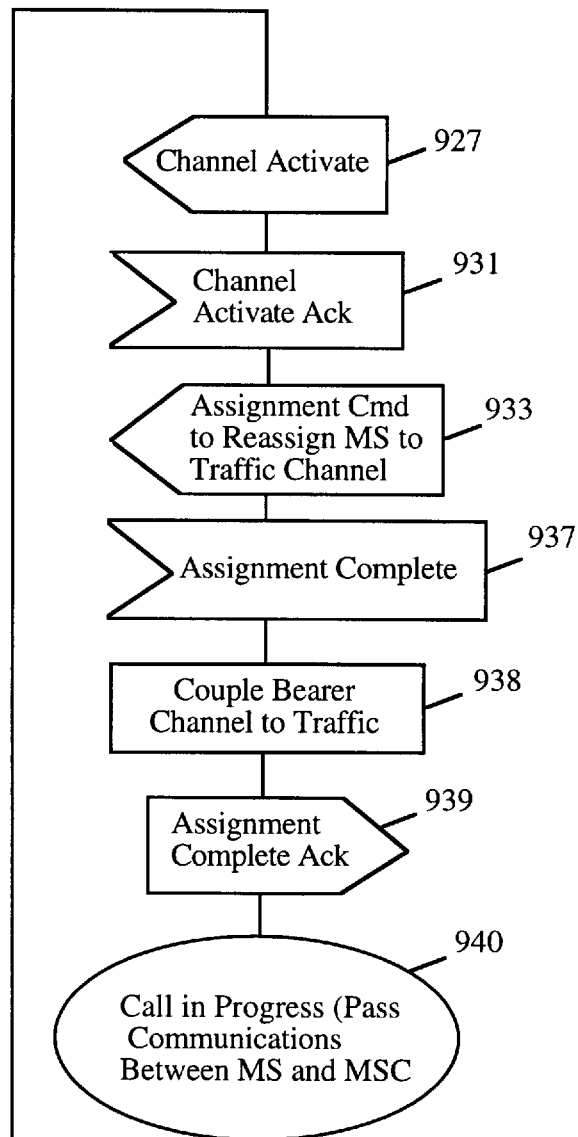

5,887,256

HYBRID CELLULAR COMMUNICATION APPARATUS AND METHOD

This application claims priority under 35 U.S.C. 119(e) of an earlier filed provisional application entitled "HYBRID CELLULAR COMMUNICATION APPARATUS AND METHOD" filed Nov. 10, 1995 Application No. 60/006,589 by inventors Priscilla Marilyn Lu and Timothy Richard White

BACKGROUND OF THE INVENTION

This is a continuation-in-part of commonly assigned co-pending U.S. patent Ser. No. 08/435,709, entitled "Cellular Private Branch Exchange," filed May 4, 1995, now U.S. Pat. No. 5,734,699.

The following co-pending U.S. patent applications are incorporated herein by reference for all purposes:

"Cellular Private Branch Exchange," filed May 4, 1995, U.S. Pat. No. 5,734,699.

"Cellular Communication Network Having Intelligent Switching Nodes," filed May 4, 1995, U.S. Ser. No. 08/435,838, now U.S. Pat. No. 5,577,029.

"Configuration-Independent Methods And Apparatus For Software Communication In A Cellular Network," filed on even date, U.S. Ser. No. 08/730,652, Attorney's Docket No. WAVEP005 and the earlier filed provisional application entitled "Configuration-Independent Methods And Apparatus For Software Communication In A Cellular Network" filed Nov. 10, 1995 Application No. 60/006,455 by inventors Priscilla Marilyn Lu and Timothy Richard White from which that application claims priority under 35 U.S.C. 119(e).

"Spread Spectrum Communication Network Signal Processor," filed on May 4, 1995, Ser. No. 08/434,554, now U.S. Pat. No. 5,682,403.

"Cellular Base Station With Intelligent Call Routing," filed on May 4, 1995, Ser. No. 08/434,598, now U.S. Pat. No. 5,734,979.

"Spread Spectrum Communication Network With Adaptive Frequency Agility," filed on May 4, 1995, Ser. No. 08/434,597, now U.S. Pat. No. 5,781,582.

For ease of reference, a glossary of terms and abbreviations is provided herewith as Appendix A.

The present invention relates generally to cellular communications networks. More particularly, a private cellular exchange network that has the ability to optionally act as a base station subsystem in an even larger network to permit nonnative handsets to use the local network's resources is described.

Presently, there are a variety of wired and wireless private branch exchanges (PBX's) that are commercially available. By way of example, FIG. 1 diagrammatically illustrates a conventional wireless private branch exchange system (wPBX) 100. As seen therein, the wPBX 100 is coupled to one or more external lines 102, which typically couple the wPBX to a public network. The wPBX 100 is arranged to control a plurality of base units 108 and is coupled to the base units by fixed wiring 104. It should be appreciated that the wPBX may control any number of base units, although for simplicity of illustration, only one such base units is explicitly shown. Each base unit 108 includes an antenna 110 to facilitate cordless communication between the base unit and one or more associated cordless handsets 112. In the typical wireless PBX system, each base unit 108 controls a pair of cordless handsets.

Although the described wPBX system offers the advantages associated with cordless handsets, there are several significant limitations. To begin with, in wireless PBX systems, the telephone number is associated with a given frequency, which is in turn associated with a fixed port on the PBX. Therefore, from the point of view of the PBX, the cordless handset is "fixed" to a PBX port just as in normal wired PBX's. Because of this, even when the wPBX is interconnected in a wPBX network, a cordless handset cannot be taken to another location controlled by another wPBX unit and still able to make and receive calls associated with its assigned phone number without having to undergo administrative moves and changes, e.g. reprogramming the wPBX itself. Consequently, the range of each cordless handset is limited by the range of the base unit with which it is specifically associated.

Further, neither the cordless handsets nor the prior art wireless PBX's have any roaming or hand-off capabilities. To illustrate, consider the situation when cordless handset 112 travels (i.e. roams) out of the range of base unit 108 during use into an area controlled by another wireless PBX. In such an event, the communications data stream is nevertheless cut off. Thus, from the perspective of wPBX 100 or the public network to which link 102 is coupled, the fact that cordless handsets 112 and 114 communicate with base 108 in a cordless manner is irrelevant. Since there are no roaming and no hand-off capabilities between base units or wPBXs, the manner in which cordless handsets 112 are coupled to base unit 108 does not provide the user with any additional advantages besides the fact that cordless handsets 112 and 114 may be made cordless inside the range defined by the transceiver within base unit 108.

Another disadvantage of typical wireless PBX systems involves their use of low-power and proprietary transceivers, which significantly limit the range over which a cordless handset can be taken from its associated base unit. By way of example, the radius of operation of the cordless handsets is typically limited to around 200 meters. Further, when calls are made among cordless handsets of the same wPBX, the call paths are typically switched, or cross-connected, at the wPBX level. In other words, the actual switching is centralized at the wPBX even if cordless handsets of the same base unit desire to communicate among themselves, e.g., between cordless handsets 112 and 114. This is because the switching function can not be delegated from wPBX unit 100 down to subsystems below it in the hierarchy, e.g., to base 108. When calls are always switched at the highest level of the hierarchy, call paths to and from the cordless handsets are oftentimes unnecessarily back hauled all the way to the highest level, i.e., the wPBX, although it may be more efficient to cross connect closer to the cordless handsets, i.e. at a base unit at a lower level of the hierarchy.

Another disadvantage of the prior art wireless PBX's relates to its inablility to authenticate calling and destination handsets to ascertain whether the handsets currently in communication with the system is in fact the intended ones. This is because any prior wireless handset that happens to be on the same frequency and utilizes the same protocol as the base unit can intercept a given call. Because of this limitation, there is no way in the prior art wPBX to define and discriminate among the particular handsets that are authorized to use the resources of the wireless system to make and receive calls from those that merely have the technical ability, but not authorized, to use those resources. For the purpose of the present disclosure, the former is regarded as native handsets and the latter nonnative ones.

It should be appreciated that in some applications, it would be desirable to provide a system which discriminates between native and nonnative handsets and permits nonnative handsets that enter an area controlled by a private exchange system to utilize the resources of that private exchange system to seamlessly connect to a public network.

SUMMARY OF THE INVENTION

To achieve the foregoing and other objects and in accordance with its purpose, the present invention relates, in one embodiment, to a hybrid cellular communication apparatus in a hybrid cellular communication network, which has a base station subsystem and a switch circuit, for facilitating cellular communication for and among a plurality of native cellular handsets. The hybrid cellular communication network also facilitates cellular communication between a nonnative cellular handset and a public cellular network, which has a public mobile-services switching center. The nonnative cellular handset represents a cellular handset that does not subscribe to the hybrid cellular communication network.

In this embodiment, the apparatus includes a cellular exchange subsystem coupled to the base station subsystem and the public cellular network. In turn, the cellular exchange subsystem includes a private mobile-services switching center coupled to the switch circuit for providing mobility management for the plurality of native cellular handsets. The switch circuit represents a node wherein a bearer data channel from any of the plurality of native cellular handsets may be cross-connected to complete a call path within the hybrid communication network.

The apparatus further includes a registry coupled to the private mobile-services switching center. The registry contains data identifying each of the plurality of native cellular handsets as handsets that subscribe to the hybrid cellular communication network, wherein the nonnative handset is not identified in the registry as a handset that subscribes to the hybrid cellular communication network. The apparatus also includes a hybrid base station controller circuit coupled to the public cellular network.

Further, the apparatus includes a circuit coupled to the registry for determining, responsive to data in the registry, whether communication data pertaining to a call received by the cellular exchange subsystem originates from one of the plurality of native cellular handsets or from the nonnative cellular handset. If the circuit determines that the communication data originates from one of the native cellular handsets, the circuit passes the communication data to the private mobile-services switching center to facilitate completion of a call path within the hybrid cellular communication network.

On the other hand, if the circuit determines that the communication data originates from the nonnative cellular handset, the circuit passes the communication data to the hybrid base station controller irrespective whether the communication data pertains to a call to one of the native cellular handsets. This passing facilitates completion of a call path to the nonnative cellular handset using mobile-services switching center resources of the mobile-services switching center in the public cellular network. In this embodiment, the hybrid base station controller functions to forward and translate communication data between the public cellular network and the base station subsystem within the hybrid cellular communication network.

In another embodiment, the invention relates to a method, in a hybrid cellular communication network which has a cellular exchange subsystem and a private mobile-services switching center, for facilitating cellular communication for and among a plurality of native cellular handsets. In this embodiment, the cellular exchange subsystem is coupled to a public cellular, and the native cellular handsets represent handsets that subscribe to the hybrid cellular communication network.

The hybrid cellular communication network further facilitates cellular communication between a nonnative cellular handset and the public cellular network, with the nonnative cellular handset being a cellular handset that does not subscribe to the hybrid cellular communication network. In this embodiment, the method includes the steps of receiving access request data, using a cellular exchange subsystem, and ascertaining whether the access request data originates from one of the plurality of native cellular handsets or from the nonnative cellular handset.

If the access request data originates from the one of the plurality of native cellular handsets, the method then passes data relating to the access request to the private mobile-services switching center for completing a first call path from the one of the plurality of native cellular handsets. On the other hand, if the access request data originates from the nonnative cellular handset, the method passes data relating to the access request data to the public cellular network for completing a second call path between the nonnative cellular handset and the public cellular network.

BRIEF DESCRIPTION OF THE DRAWINGS

The invention, together with advantages thereof, may best be understood by reference to the following description taken in conjunction with the accompanying drawings in which:

FIG. 5 is a simplified representation of a native user record format in a registry in accordance with one embodiment of the invention;

FIG. 8 is a flow diagram illustrating a method of handling a call from a nonnative handset suitable for use in step 915 of FIG. 6;

DETAILED DESCRIPTION OF THE PREFERRED EMBODIMENTS

The present invention relates generally to local cellular exchange systems. More particularly, hybrid local cellular exchange systems are described that permit nonnative handsets to utilize the resources of the local cellular exchange system to communicate through a public (or at least non-local) network. By way of background, a detailed description of a modular local cellular exchange system is provided in U.S. Pat. No. 5,734,699 which is incorporated herein by reference. The described embodiments are extensions of the systems described therein. The distributed switching and TRAUing functions utilized in the hybrid system described herein are further described in detail in co-pending application Ser. No. 08/435,838 which is also incorporated herein by reference.

Figure 1:
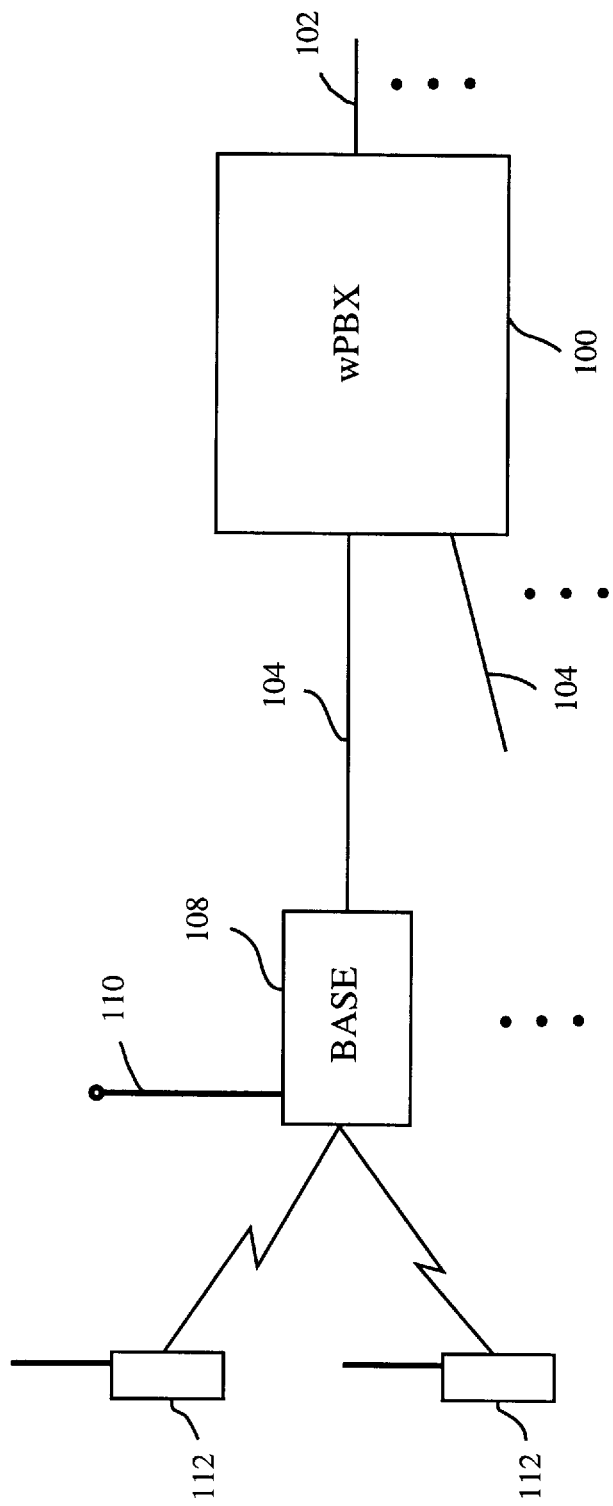
FIG. 1 is a simplified illustration of a conventional wireless private branch exchange system (wPBX)
Figure 2:
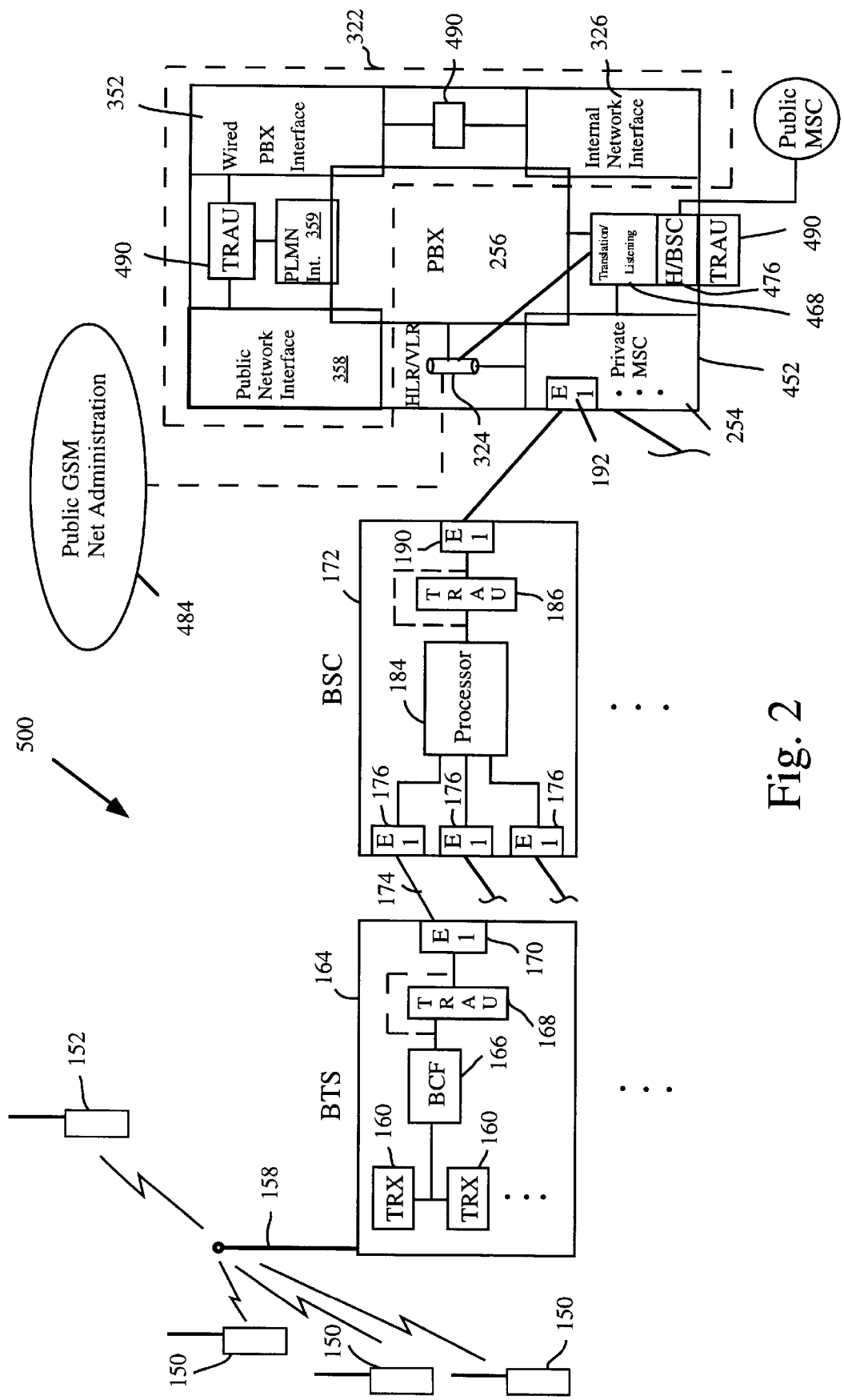
FIG. 2 is a simplified illustration of a hybrid private cellular exchange system in accordance with one embodiment of the present invention.
Figure 3:
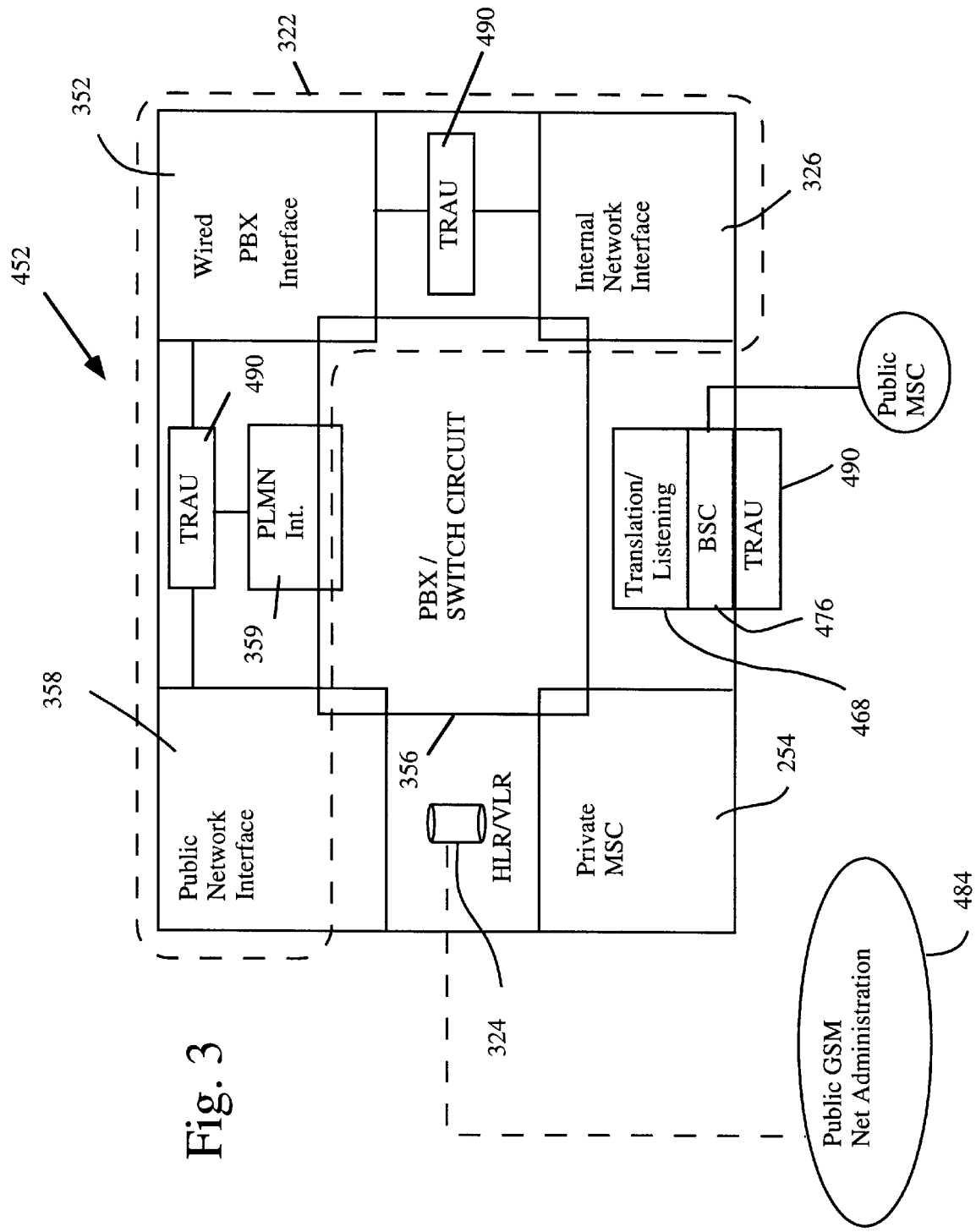
FIG. 3 is a functional block representation of a hybrid cPBX subsystem in accordance with one aspect of the present invention.
Figure 4:
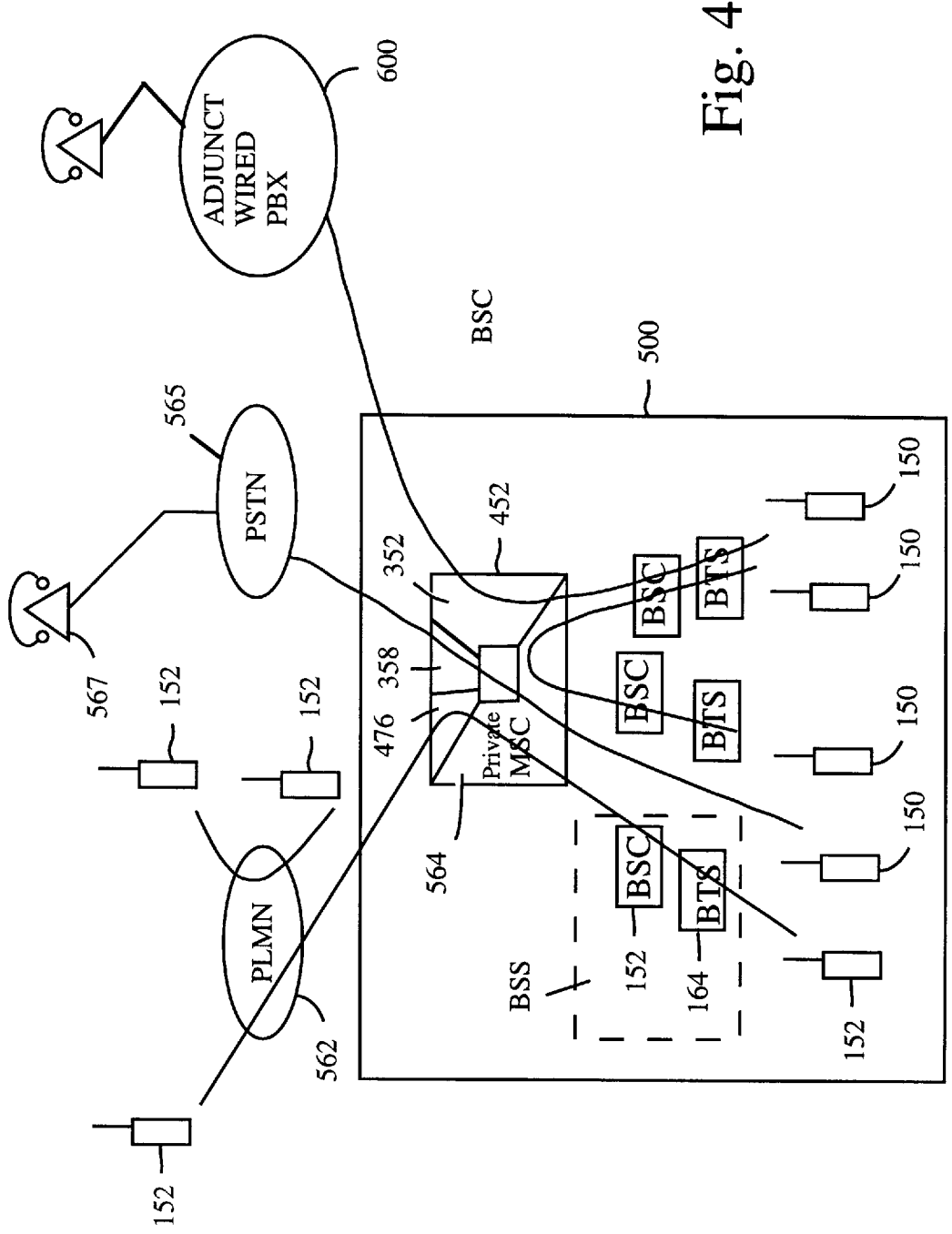
FIG. 4 is a block diagram illustrating, in simplified form, the architecture of a particular hybrid local network in accordance with one embodiment of the present invention.

Referring initially to FIGS. 2–4, a hybrid network 500 that is arranged to permit nonnative handsets to utilize the resources of a local cellular exchange system to communicate to a public network in accordance with one embodiment of the present invention will be described. The described embodiment is set up for operation in compliance with the Global Systems for Mobile Communication (GSM) protocol that will be familiar to those skilled in the art. However, it should be appreciated that other communication protocols can be used as well. Since many of the components described herein accomplish GSM functions, familiar terms such as mobile-services switching center (MSC), base station controller (BSC), base transceiver station (BTS), Home Location Register (HLR) and Transcoder-Rate Adapter Unit (TRAU) will be used herein. However, as will be apparent from the described embodiments and the incorporated references, many of the described components may be embodied as modular components that have significant advantages over components of conventional systems.

In the embodiment shown in FIG. 2, the hybrid local cellular exchange system 500 includes a cPBX subsystem 452 that performs many of the switching functions of a GSM mobile-services switching center (MSC). The cPBX controls one or more base station controllers (BSCs) 172, each of which controls one or more base transceiver station (BTSs) 164. Each base transceiver station (BTS) 164 in turn is capable of coordinating communications with a plurality of cellular handsets 150, and 152 (commonly referred to as mobile station units (MSs)) that are located within the range of the BTS's antenna subsystem 158. For the purposes of this description it becomes important to distinguish between "local" handset 150 that are "native" to local cellular exchange system, and "normative" handsets 152 that do not belong to the local exchange. More specifically, "native" handsets are registered with the private registry within cPBX subsystem 452, while "normative" handsets are not (although in some embodiments, they are substantially equivalent functionally).

In one embodiment of the hybrid local cellular exchange system 500, (referred to herein as the "hybrid network" or "local network") call paths between the native handsets 150 preferably remain within the domain controlled by the local network. In other words, calls paths among native handsets are preferably switched, or cross-connected, entirely within cellular exchange system 500 without using public network resources. Calls from native handsets 150 out of the local cellular system may be passed to an external system that, by way of example, may be a public cellular network such as a Public Land Mobile Network (PLMN) 562; a public wired network such as a public switched telephone network (PSTN) 565 or an adjunct wired PBX 600. Bearer data paths for the above calls are shown in FIG. 4.

When multiple local cellular exchange systems are coupled together to form a network having multi-site configuration, calls from a native handset to a handset in another local cellular exchange system may be routed entirely within the multi-site network, or routed through a public network if both the origination and the termination local cellular systems are coupled therewith. In all cases, calls made to and from outside of the local cellular exchange system are preferably made through a Gateway MSC (GMSC) 322, where there are provided appropriate interfaces for such external communication. The flexibility of the local network in being able to route calls through different types of services, i.e. wired (PSTN), cellular (PLMN), or a multi-site network of local cellular exchange systems using different routing paths is a significant advantage since the billing schemes of PSTN and PLMN providers are typically quite different.

Additionally, the hybrid network has the ability to seamlessly handle calls from and to nonnative handsets 152 that are roaming within its area. This situation occurs when, for example, there is provided a hybrid network within an environment such as a shopping center, a manufacturing plant, or even a remote geographic location, and a nonnative handset user who is inside that environment now wishes to use the resources of the hybrid network to establish communication with the public network, e.g., with the PLMN.

When a call from a nonnative handset is originated from within the hybrid network, cPBX subsystem 452 effectively identifies that the call is being originated by a nonnative handset and passes the call to the public cellular network (e.g. PLMN 562). From the standpoint of the PLMN, the hybrid network acts and functions like an ordinary base station subsystem (BSS). Thus, as will be described in more detail below, the cPBX subsystem 452 has the ability to monitor calls and/ or location updates originating therein, determine whether such calls or location updates has been originated from native or nonnative handsets to handle the request accordingly. If it is ascertained that the call originates from a native handset 150, the call is handled as normal local calls between two native handsets. On the other hand, when it is determined that the call originated from a nonnative handset 152, the cPBX essentially acts as a conduit between that nonnative handset and the public MSC in PLMN 562.

The described hybrid network systems may be utilized in a wide variety of applications where it is desirable for native handsets to communicate with one another without the overhead of a public system, yet also permit nonnative handsets to use the resources of the hybrid network to access the public network. By way of example, in corporate applications, it may be desirable for a company to have an internal cellular communications system, yet still allow visitors or customers to use their own cellular phones while on-site. Similarly, it may be desirable for a shopping centers, office complex, office building or other such multiple tenant operations to provide their tenants with intra-facility communications, while also permitting customers to use the building or complex's cellular resources to connect to the public network. In remote locations, the local hybrid network may be implemented for a community, a production operation, or any of a wide variety of other organizations which have similar needs.

In some applications it may be desirable to limit the local network resources used by nonnative handsets so as to preserve a minimum level of access for native handsets. By way of example, a hybrid network 500 may be designed such that up to 20% of the radio bandwidth of the private network may be allocated to nonnative handsets while at least 80% of the radio bandwidth resources should be allocated to native MS units. Of course, the bandwidth reserved for native handsets may be widely varied to meet the needs of a particular system. The ability to govern the sharing of resources between native handsets and nonnative handsets ensures that native handsets will not be precluded access by an excessive influx of calls involving nonnative handsets in the local area. Other priority resource allocation schemes may be used as well. By way of example, nonnative handsets may be allowed to access any unused resources with the caveat that they may be "bumped" when resources they are using are subsequently required by native handsets requesting access.

Referring next to FIGS. 2 and 3, a suitable network structure for the hybrid cellular exchange will be briefly described. The handsets 150, 152 are arranged to communicate with a base transceiver station (BTS) 164 using an appropriate radio link (RL) protocol. By way of example in a GSM system, the radio link (RL) protocol may take the form of a LAPD-M protocol at GSM layer 2 and is defined by standard GSM 08.58. Each of handsets 150 and 152 contains hardware and software that is suitable for handling, from its end, any required functions such as the GSM functions of radio resources control (RR), mobility management (MM), call control (CC), short message service (SMS), supplemental services (SS), and the like.

The base transceiver station (BTS) 164 includes the antenna subsystem 158, a Base Control Function (BCF) 166, a plurality of transceiver units (TRXs) 160, a Transcoder-Rate Adapter Unit (TRAU) 168 and a trunk module 170. Although BTS 164 shows only two transceiver units (TRXs) 160 for illustration purposes, it should be understood that a typical BTS unit may have any number of transceiver units. Each of TRXs 160 outputs bearer data, which may be 8 Kbit/s or 16 Kbit/s (GSM) time division multiplexed (TDM) data representing, for example, voice conversations, facsimile, digital data, and the like. A TRX also outputs signaling information which is packet information that is forwarded either to the MS's via antenna subsystem 158 for transmitting to the MS's or from the MS's to a base station control function (BCF) 166 for communicating with a base station controller (BSC) 172 or a mobile-services switching center (MSC) 254.

Base control function (BCF) 166 represents a CPU module that runs the software necessary to handle provisioning of the TRAU or trunk resources at the request of base station controller (BSC) 172. It should be appreciated that both the TRAU 168 and the trunk modules 170 are resources that may optionally be used when desirable to improve the efficiency of the system. They are not strictly required to permit communications between nodes in the network, (such as between the BTS and the BSC, or between the BSC and the cPBX) especially when two or more of the nodes are located in a single chassis as described below.

The transcoder-rate adapter units (TRAUs), such as TRAU 168, 186, and 490, represent resources that has the ability to convert among 8 Kbit/s, 16 Kbit/s, 32 Kbit/s, and 64 Kbit/s time division multiplexed data stream. As can be appreciated by those skilled in the art, the conversion of lower-rate data streams to 64 Kbit/s time division multiplexed data stream is typically necessary for communication out of the private cellular network. As has been described in co-pending patent application Ser. No. 08/435,709, such conversion may not be necessary when two native handsets communicate at sub-64K bits rate.

Trunk module 170 is a resource that facilities communications between various components in the network over the communication lines, e.g., standard wired telephone lines. Thus, the nature of the trunk module will vary in accordance with the type of communication lines used. In many existing GSM applications, standard E1 telephone lines are used as the medium for transmitting information between the nodes in the cellular network. Accordingly, in the embodiment shown, the trunk module 170 is suitable for transmitting and receiving signals over E1 lines and is therefor sometimes referred to as an "E1 module" herein. In one embodiment, E1 module 170 represents a 2.048 Mbit/s signaling wired interface that is channelized into 64 Kbit/s channels. Of course if other communication lines are used, such as fiber optic lines, T1 lines, etc., the appropriate trunk module would be used.

Functionally speaking, the job of BSC unit 172 is radio resource (RR) control. It manages certain requirements regarding the status and location of the mobile stations and details regarding how to communicate with the mobile stations in the appropriate modulation scheme. In this manner, BSC unit 172 helps to hide this level of detail from any components upstream, e.g., cPBX 452 or the public network that is upstream from cPBX 452. BSC unit 172 also handles power control. BSC unit 172 directs its BTS units 164 and the transceiver units therein to adjust their transmission power and/or the transmission power of a handset that it is communicating with, as required to improve transmission quality. Furthermore, BSC unit 172 also monitors handset communication quality to prepare for power hand-overs, e.g., when one of the handsets roams among the different areas controlled by different BTS's. When a handover is eminent, BSC unit 172 further initiates the handover.

As seen in FIG. 2, BSC unit 172 may have multiple downstream trunk modules 176 for communicating with multiple BTSs. BSC unit 172 further includes a processor 184 for handling the aforementioned radio resource control (RR), an optional TRAU unit 186, and an upstream trunk module 190 that facilitates communications with cPBX subsystem 452. As pointed out above, cPBX subsystem 452 may communicate with a plurality of BSC units 172 and may include a downstream trunk module 192 for each associated BSC. Again, it should be appreciated that any of the described trunk modules may be eliminated when the various components can communicate over a local bus as opposed to a wired line or the like.

Referring next primarily to FIG. 3, a cellular exchange subsystem 452 (cPBX) in accordance with one embodiment of the present invention includes a gateway to the MSC (GMSC) 322, a private MSC block 254, a PBX block 356 and a registry 324. The gateway provides interfaces that facilitates communication between the local network and the outside world. The actual interfaces provided will vary to a great extent in accordance with the needs of a particular system, although at least one interface to a public (or other large scale) cellular network (PLMN) is required for the described hybrid systems.

In addition, the GMSC 322 may also include one or more PSTN interfaces (or other wired public interfaces), and/or one or more internal network interfaces 326. The internal network interfaces may, by way of example, connect the hybrid network to another cPBX in a multi-site cPBX network or to a wired PBX. For further information regarding the multi-site cPBX configuration, reference may be made to, for example, the above-mentioned U.S. Pat. No. 5,734,699. Calls utilizing the internal network interface 326 may, but typically do not, utilize the TRAU unit. By way of example, when calls are made among cPBXs of the multi-site cPBX overlay network, TRAUing is often not necessary. This is because the handsets making those calls typically transmit and receive at the same rate. As mentioned earlier, the ability of the present invention to TRAU only when necessary advantageously improves the quality of the sound or data transmitted/received and reduces the computational overhead associated with performing rate conversion.

The registry 324 is provided to keep track of handset that have a home location within the cPBX subsystem, i.e., the native handsets. Thus, the registry 324 performs the functions of both the HLR and VLR registries that are familiar to those acquainted with the GSM standard. In some embodiments, the registry 324 is at least partially coordinated with the public GSM net administration 484 since the local network may need to know certain subscriber information that is available in the public HLR, e.g., home base information, valid supplemental service for specific handsets, and the like. In other embodiments, the registry 324 may be considered a GSM VLR which obtains its subscriber and other data from the GSM public HLR using standard GSM protocols. In other systems, no coordination would be contemplated.

The internal network interface 326 may represent a trunk module which has been loaded with the appropriate software to implement a cPBX protocol for communicating with cPBXs in a multi-site overlay network in which separate cPBXs are spaced apart and linked to each other through either private lines or the public network. For further example regarding the software for implementing the modules of the present invention, reference may be made to, for example, a co-pending patent application entitled "Configuration-Independent Methods and Apparatus for Software Communication in a Cellular Network," (Attorney's Docket Number WAVEP005), Ser. No. 08/730, 652 filed on even date and incorporated herein by reference. In such a system, each registry 324 may contain information about handsets controlled by all other cPBXs in the overlay network in addition to its "local" handsets. Thus, when an MS unit roams from an area controlled by its home cPBX into an area controlled by a sister cPBX in the multi-site network, the sister cPBX will have the information necessary to identify and handle the roaming handset that requires the use of its resources.

PBX block 356 handles the local call control (CC) function, which includes the ability to intelligently understand the destination intended for the telephone number dialed. PBX block 356 may also contain circuitry and/or software for performing functions typically expected of a PBX system such as call forwarding, call transfer, and the like. In one embodiment, the function of PBX block 356 may be performed by a switch circuit, preferably one implemented in software. Consequently, the term PBX block 356 and switch circuit 356 may be used interchangably herein. The switch circuit may, if necessary, represent an existing switch circuit around which the cellular exchange subsystem 452 is built.

The private MSC block 254 includes circuitry and/or software to handle mobility management (MM), short message service (SMS), and other supplemental services (SS). Optionally, the private MSC block 254 performs some radio resource (RR) handling, e.g., inter BSC hand-overs and handovers among cPBX subsystems 452 in a multi-site configuration. In one embodiment, handover may also occurs outside of the hybrid network, e.g., to the public network. Inter BSC handovers occurs when a mobile station roams among the BSCs controlled by cPBX subsystem 452. In this case, the radio resource control must be handled by the upstream cPBX since a BSC would not know how to hand-over to another BSC when the mobile station roams from a first BSC to another BSC.

The invention advantageously provides MSC functionalities, via private MSC block 254, to calls involving native cellular handsets. In this manner, it is typically not necessary to backhaul calls involving native handsets to the public network to utilize the, MSC functions, e.g., mobility management (MM) and the like, therein. In this manner, MSC functionalities are offloaded from the public network to the private network for calls involving native cellular handsets. Advantageously, the bandwidth of the public network is improved since the bottleneck involving public MSC usage is substantially relieved.

For calls involving nonnative handsets, the public MSC is still preferably utilized to make use of the MSC functions in the public MSC. In this manner, the entire hybrid cellular communication network functions a base station subsystem to pass data between the public MSC and the nonnative cellular handsets.

As will be apparent to those skilled in the art, conventional GSM configurations typically incorporate TRAU unit in the BSS and therefore, the MSC switches only at 64 Kbit/s. In contrast, in the embodiment shown, TRAU resources are provided at a variety of levels, including at the cPBX 452. Thus, calls within the local exchange subsystem which do not need to be TRAUed are not TRAUed. As is mentioned earlier, the elimination of unnecessary TRAUing improves both the quality of the transmitted call and effectively eliminates the computational overhead associated with the TRAUing process.

When handling calls originated from nonnative handsets that are roaming within the local network, the cPBX effectively functions as a BSS from the perspective of the PLMN network. To facilitate this, the cPBX includes a listening unit 468 and hybrid BSC block 476. Hybrid BSC block 476 is basically a software block that forwards signalling data between the BSC's of the hybrid network and the public MSC. Listening block 468, preferably implemented via software, deals primarily with signalling data while BSC block 476 and TRAU block 490 deal primarily with bearer data. As is mentioned, TRAUing may be necessary when bearer data are presented to the public MSC.

In accordance with one aspect of the present invention, a nonnative cellular handset preferably utilizes listening/ translation circuit 468 and hybrid BSC 476 to communicate with a public cellular network, and more specifically to the public MSC within the public celluar network. Native cellular handset preferably utilizes either public network interface 358, PLMN interface 359, wired PBX interface 352, or internal network interface 326 for communicating with public networks that are external to the hybrid cellular communication network. By way of example, a native cellular handset may utilize public network interface 358 to communicate with a wired public network, e.g., a PSTN. The native cellular handset may also utilize PLMN interface 359 to communicate with a public cellular network, e.g., a PLMN. Consequently, as the term is used herein, a pubic network refers to a network that is external to the hybrid cellular communication network, whether that public network is a PSTN, a PLMN, an ISDN, or others. Thus, the hybrid cellular communication network, via an appropriate interface, facilitates communication between a native cellular handset and a public network.

If a handset that is not registered with the private registry of the hybrid network (i.e. a nonnative handset) attempts to use the resources of the private network to make or receive calls, the cPBX subsystem of the private hybrid network, e.g., cPBX subsystem 452, enters a hybrid mode and acts as a public BSS (if bandwidth is available) to allow that nonnative handset to communicate with the public network. In other words, cPBX subsystem 452 acts as a part-private cPBX, part-public BSS.

Referring next to FIG. 5, the registry 324 will be described in somewhat more detail. The HLR portion of the registry contains information pertaining to all of the native handsets. By way of example, such information may include subscriber information, supplemental service (SS) information, or the like. In a network of multi-site cPBXs, the registry information would typically be duplicated in all interconnected cPBXs. The VLR portion of the registry contains information indicating which of the identified handsets are currently in the area controlled by the cPBX.

In the embodiment shown, each record includes a field for storing an identification of each of the native handsets. By way of example, the identification field may store a handset identifier, e.g., an International Mobile Subscriber Identifier (IMSI) associated with the handset, or some abbreviated version thereof. The illustrated registry also includes fields for the telephone number assigned to the associated handset; subscriber information such as name, social security number, billing address, billing information; authorized supplemental services and the like. Typically, a home location field is provided for storing information regarding the home location, i.e., an identification the cPBX subsystem considered to be the "home" for the particular MS unit associated with the record. Further, there may be a current location field, that indicates the actual local cellular network at which the handset is currently situated, i.e., the specific one in a network having a multi-site configuration. Thus, both the current and home locations of the handset are identified.

The current location of a handset is preferably determined as the handset periodically checks in. If the MS does not report its location periodically or does not respond to a page from the private MSC, the HLR will assume that the MS is powered off and will mark the that MS as NOT AVAILABLE, or some version of that message, in the HLR. If a handset is not turned on, the signaling session ends after a predetermined period and is identified as being not available in the registry. By way of example, the current location entry of the record associated with the inactive handset may be arranged to read NOT AVAILABLE, or some version of that message. Depending on the needs and configurations, the registry may include a greater or fewer number of fields as appropriate. In some embodiments, the registry records are defined using a GSM format. The use of a standard GSM formats in the private registry facilitates coordination with the public registry for the purpose of handling handsets that can operate both under control of the local network or directly under control of the public network. Configuration of the private registry may be performed by the system operator during periodic update/maintenance periods. During these update periods, the system operator may create a new record, delete a record, obtain a record for review, or edit information in a record.

In one embodiment, there also exists a column for specifying the network identifier for each cellular handset. A network identifier may be advantageous in environments where there exists a plurality of overlapping private cellular network, and there exists a need for identifying the specific private network to which a given handset belongs.

Referring next to FIGS. 6–11, a method of coordinating calls from both native and nonnative handsets in accordance with one embodiment of the invention will be described. It should be appreciated that the vast majority of the handling protocol will be dictated by the protocols of the public system that the hybrid network operates transparently with (i.e. PLMN 562). The reason for this is that from the standpoint of a nonnative handset 152, a call originated within the local network must look and feel the same as a call originated outside of the local network. In the described embodiment, the associated public network conforms to the GSM standard. Accordingly, the BTS to BSC and BSC to cPBX (i.e. MSC) communications in the described embodiment are in accordance with the GSM standard. As pointed out above, the cPBX subsystem 452 has the ability to monitor communication data such as access request data that relates to calls and/or location update requests originating therein. As is known, such access request data may include GSM messages such as LOCATION UPDATING REQUESTS, CM SERVICE REQUEST, CM REESTABLISHMENT REQUEST, PAGING RESPONSE, and IMSI DETACH as appropriate. CPBX subsystem 452 then determine whether each such call or location update requests originated from a native or a nonnative handset and handle the calls accordingly. When the call or location update request originates from a native handset 150, the cPBX effectively acts as described in the referenced U.S. Pat. Nos. 5,734,699 and 5,577,029, Ser. Nos. 08/435,838, and 08/730, 652. On the other hand, when it is determined that the call originated from a nonnative handset 152, the cPBX essentially acts as a conduit between the BSC 172 and the public MSC 562. Thus, the hybrid local cellular exchange system takes on the appearance of a standard BSS from the perspective of the nonnative handsets and the public network.

Figure 6:
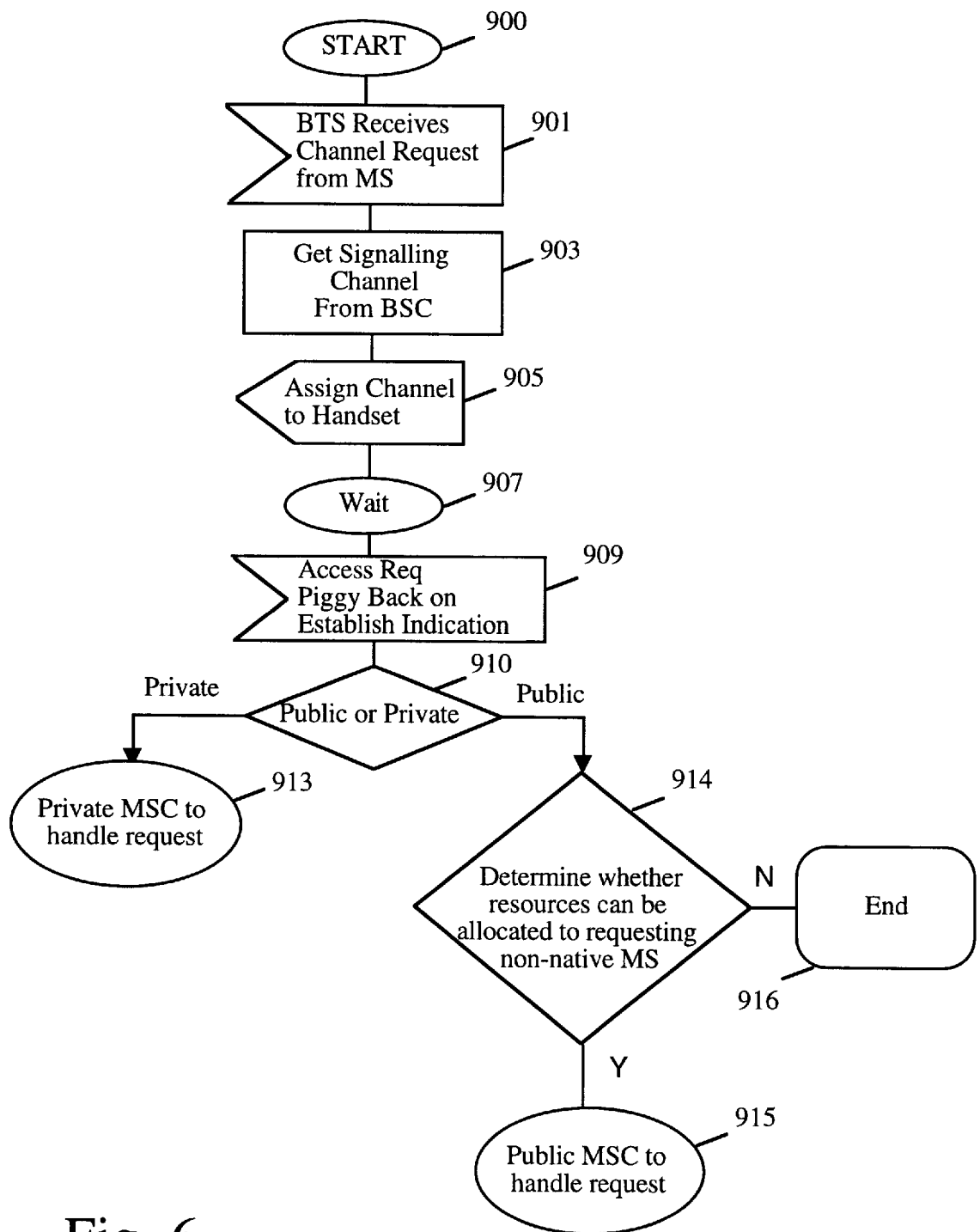
FIG. 6 is a flow diagram illustrating a method of handling an access request originating from a handset located within a hybrid local cellular exchange in accordance with one embodiment of the invention.

Referring next to FIG. 6, the handling of a channel request in accordance with one embodiment of the invention will be described. Initially, a handset (MS unit) sends out a channel request which is received by the nearest BTS in step 901. The channel request essentially asks for a channel for the handset to operate on. There is no voice path assigned at this point since it is not known whether the handset is performing a location update, call origination, or responding to a beacon message on a dedicated channel reserved for determining the location of the handset. At step 903, the BTS gets a signaling channel from the BSC and at step 905, the signaling channel is assigned to the requesting handset. After the signaling channel has been assigned, the BTS and BSC simply wait for an access request from the handset in step 907. At this point, the channel has been established. Generally, an access request will follow next from the handset. As will be appreciated by those skilled in the art, an access request may be piggybacked on the establish indication which is passed from the BTS to the BSC. The establish indication (received in block 909 of FIG. 6) is used to build a connection between the BSS and the MSC (which may be a private MSC for purely local calls or a public MSC for calls to the external network) which is referred to as a Mobility Management session (MM-session). This is the first message passed to the MSC.

Upon receiving the access request, the cPBX subsystem 452 determines whether the requesting handset is a native or nonnative handset operating within the hybrid networks coverage area in step 910. The requesting handset type determining step is described in more detail below with respect to FIG. 10. In effect, when the handset is identified as a native handset (i.e. it is listed in the registry 324 or subscribes to the hybrid network), the call will be administered by the private MSC 254 as illustrated by step 913. The administration of such native calls is described in somewhat more detail below with respect to FIG. 11. Still further details are provided in the referenced co-pending applications, particularly Ser. No. 08/435,709. On the other hand, if the requesting handset is determined to be a non-native handset (i.e. it is not listed in the registry 324), a determination is made as to whether resources will be allocated to the requesting nonnative handset in step 914. If not, the call will be terminated in step 916. If so the call will be administered by the public MSC 562 as illustrated by step 915. In this case, the private MSC will simply pass further communications between the BSC 172 and the public MSC 562. Thus, the hybrid network gives the public MSC 562 the appearance of a standard BSS in the public network. The administration of such nonnative calls is described in more detail below with respect to FIG. 8.

As discussed above, the actual resource allocation rules used in the resource allocation determining step 914 may be widely varied in accordance with the needs of any particular system. By way of example, nonnative handsets may be limited to a given percentage of the hybrid network's total communication bandwidth. Alternatively, nonnative handsets may be permitted access any time there are available resources or available resources exceed a designated number. Of course more sophisticated resource allocation schemes may be used as well, as for example schemes that consider the location of the nonnative handset within the private network, the traffic on the resources would actually be used by the nonnative handset, etc.. If the determination is made in step 914 that resources can not or will not be allocated to the nonnative handset, the call will be terminated in step 916. Alternatively, the private MSC may be request that the public MSC hands off this call to a neighboring public cell, which may then handle the call using standard GSM procedures.

Figure 7:
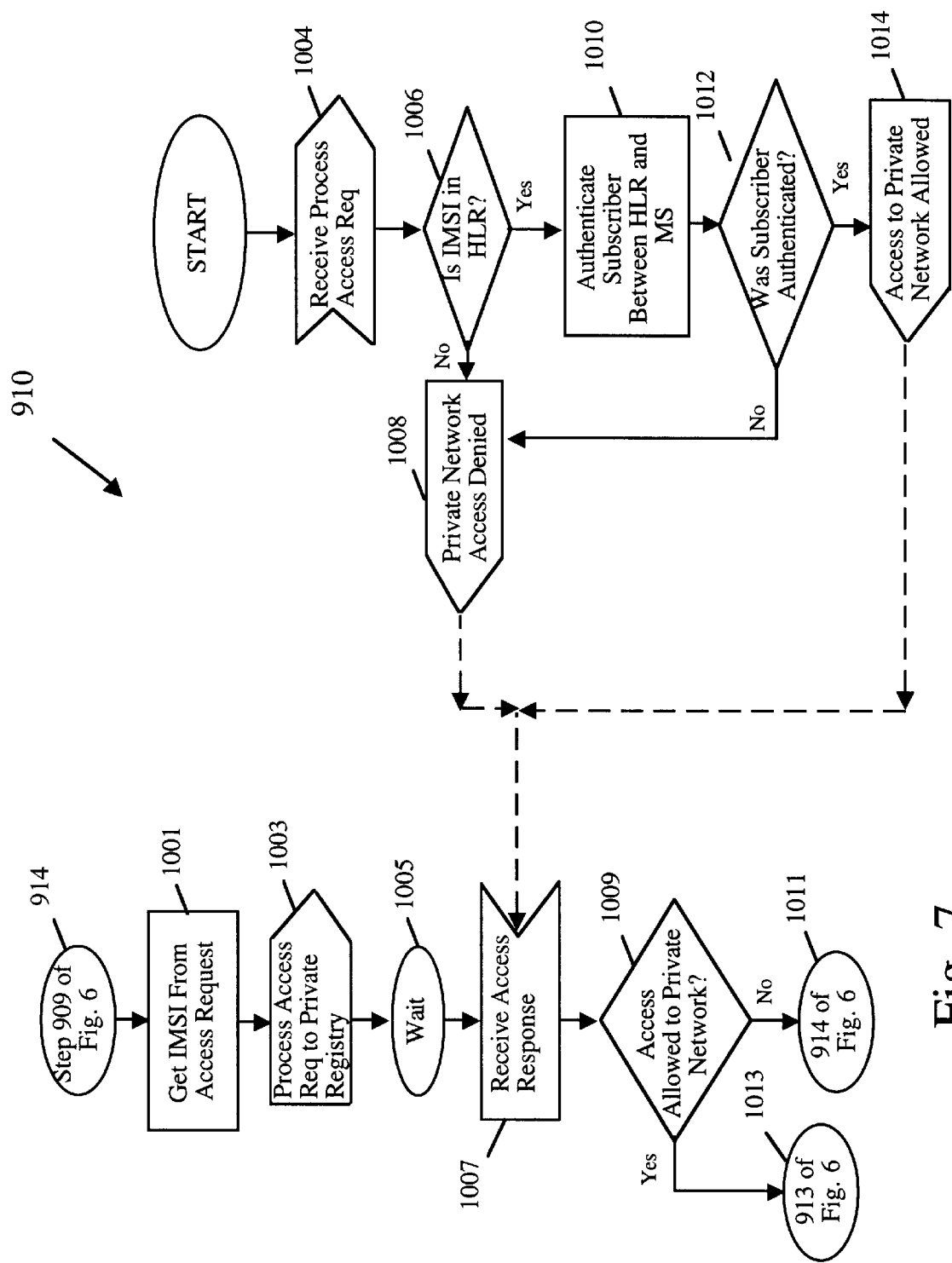
FIG. 7 is a flow diagram illustrating a method of determining whether the originating handset is a native or a nonnative handset suitable for use in step 910 of FIG. 6.

Referring next to FIG. 7, a method suitable for accomplishing the determination of whether a call is made from a native or nonnative handset (step 910 of FIG. 6) will be described in more detail. Typically, the steps of FIG. 7 are performed by the translation/listening circuit 468 of FIG. 3. Initially, it should be appreciated that standard GSM access requests received from the handset in step 909 will each contain an International Mobile Subscriber Identification (IMSI) of the requesting handset. The IMSI is retrieved in step 1001 by the listening unit 468 within the cPBX subsystem 452 so that a determination can be made as to whether the requesting handset is a native or nonnative handset and appropriate action can be taken. The capability of looking at the IMSI and adjusting functionality accordingly, is referred to as Promiscuous Listening. The feature of Promiscuous Listening signifies an added intelligence implemented in the present invention and highlights one of the difference from conventional approaches.

In some embodiments, a location update request may contain a version of the IMSI, known as a TMSI (temporary MSI that is used in place of the IMSI for, among others, security reasons). The identity of the handset, via either the IMSI or TMSI, uniquely identifies the handset that desires a location update or access. After the IMSI (or an abbreviation thereof) has been retrieved from the access request, a process access request call is made (in block 1002) by the private MSC to the registry 324, which starts up an authentication process. The process access request call is received by the registry 324 in corresponding step 1004 and the ISMI (or an abbreviation thereof) is check against the HLR/VLR (Home and Visitor Location Registry) which contains a listing of authorized users in the private network in step 1006. If the IMSI is found in the registry, then it is presumed that the originating handset is a native handset and the subscriber is authenticated in a conventional manner in step 1010. In some embodiments, the authentication may require the handset to provide an encrypted key to help prevent user fraud.

In block 1010, if the IMSI is not found in the HLR, it is, in one embodiment, denied access to the private network immediately so that it can be passed to the public MSC (in step 1008 of FIG. 7 and step 915 of FIG. 6) for authentication. If the IMSI is found but fails private HLR authentication then access to the private network is also denied. However, this IMSI is not subsequently passed to the public MSC (in blocks 914 and 915 of FIG. 6) since the call associated with this access request is presumably a fraud. In accordance with the GSM protocols, a determination of whether the subscriber was authenticated is then made in step 1012. Assuming the subscriber is authenticated, a private network access granted signal is returned to the private MSC in step 1014.

While the registry checking and authentication steps are being performed, the private MSC process is essentially in a wait state step 1005. When a private network access granted or denied signal is received (step 1007), the private MSC then determines whether access has been allowed in step 1009. If so, the process proceeds to step 1013 where the originating handset is treated as a native handset and the private MSC handles the request as discussed above with respect to FIG. 6. If not, the method proceeds to step 1011 where a determination is made as to whether to allocate resources to the nonnative handset (if the handset that generates the access request is a nonnative handset). If the handset generating the access request is a native handset but failed the authentication procedure in block 1010, there is no need to proceed to block 914 of FIG. 6 to determine whether resources should be allocated (on the assumption that the call attempted was fraudulent).

Figure 9:
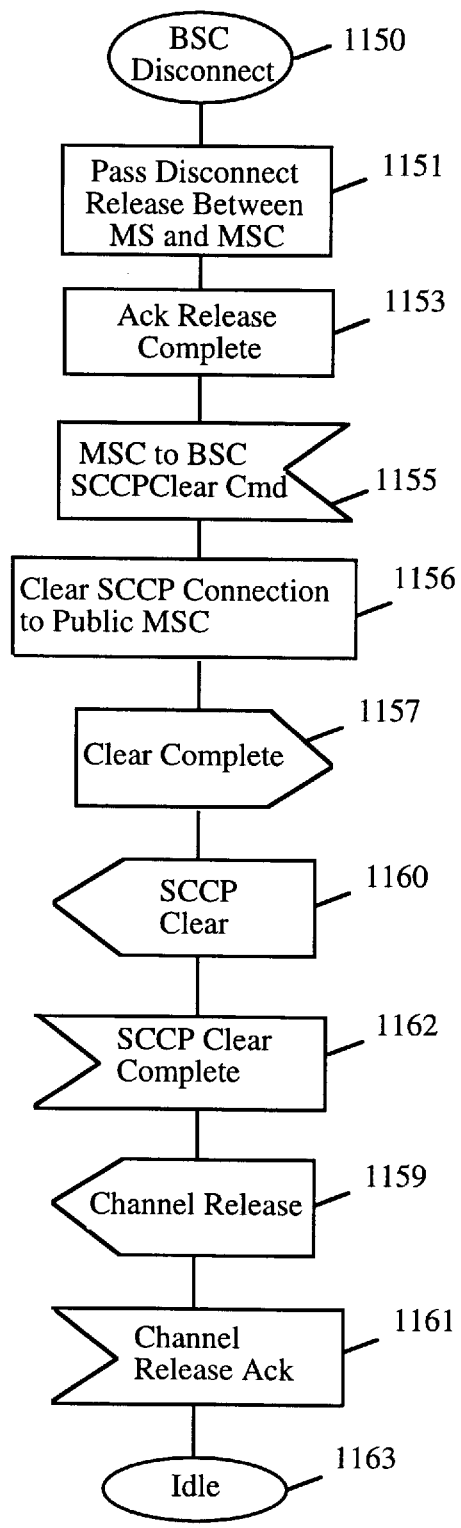
FIG. 9 is a flow diagram illustrating a method of terminating a call in accordance with one embodiment of the present invention.

Referring next to FIG. 8, one suitable process for handling public calls (i.e. calls originated from nonnative handsets) will be described. FIG. 8 is a detailed discussion of block 915 of FIG. 6. Typically, the steps of FIGS. 8 and 9 are performed by the translation/listening circuit 468 and hybrid base station controller block 476 of FIG. 3. Once the determination has been made in step 914 that resources will be allocated to the nonnative handset's request, a SCCP connection is built to the Public MSC in step 918. The establish indication message is substantially a copy of the message received in block 909 of FIG. 6 and essentially extends the MM session from this nonnative MS unit to the public MSC. At this point, since the handset has been identified as nonnative, the cPBX subsystem 452 essentially changes its behavior from a MSC to a conduit between the BSC 172 and the public MSC. Assuming the MM session is established, subsequent messages and data between the nonnative MS unit and the public MSC then pass substantially transparently through this cellular exchange subsystem cPBX subsystem 452. However, it should be noted that the SCCP session ID's that are internal to the private hybrid network 500 and those that are external to it may differ and may therefore require translation. Additionally, A-interface parameters such as bearer channels ID's, as well as other data internal to the private network, may also differ from those that are external to it and require appropriate translation. In one embodiment, the translation function is performed by blocks 468 (Translation/Listening) of FIGS. 2 and 3.

After the connection has been confirmed in block 917, a subscriber authentication is passed transparently through cPBX subsystem 452 from the public MSC to the handset in step 919. Then a setup request is passed transparently from the handset to the public MSC in step 921 to setup the call. The setup message contains call control information such as the called party address and indication of any bearer services to be provided. The public MSC then queries its own Visitor Location Registry (VLR) to determine whether the public handset is allowed to make an outgoing call, and assuming such a call is authorized, the VLR tells the MSC to complete the call and proceed with call setup.

The MSC subsequently sends a Call Proceeding message substantially transparently through cPBX subsystem 452 to the handset in step 923, which indicates that the public MSC will process the call. As will be appreciated by those skilled in the art, the previously described interactions will take place on a signaling channel. It is now necessary to assigned an actual bearer channel. This is initiated by an assignment request for a traffic channel that is received by the private MSC/BSC in block 925, which proceeds to assign a second traffic channel within the private hybrid network 500 between cPBX subsystem 452 and BSC 172 in step 926. The traffic channel is selected from the free channels that are available on the link between cPBX subsystem 452 and BSC 172. Continuing to step 927, a channel activate message is sent from the BSC to the BTS which essentially asks the BTS to activate the selected channel. The BTS activates the requested channel and confirms the activation to the BSC via a Channel Activate Acknowledgment signal as shown in step 931. Thereafter, in step 933, the BSS sends the handset an Assignment Command that designates a traffic (voice/data) channel for the current communication thereby reassigning the handset to the newly assigned traffic channel. The handset then sends an Assignment Complete message to the BSS on the new channel, as shown in step 937. Thereafter, the assigned bearer channel is coupled to the assigned traffic channel in step 938. Then in step 939, an Assignment Complete Acknowledge is sent from the BSC to the public MSC over an overhead signaling channel. The message sent may be, as noted above, modified by Translation/Listening unit 468 of FIGS. 2 and 3 to ensure proper communication between the nonnative MS unit and the public MSC. Thereafter, the call is in progress and the communications between the nonnative handset and the public MSC are simply passes back and forth by the BSC.

At some point the call will be ended. A procedure suitable for use in disconnecting a call from the standpoint of the BSC in accordance with one embodiment of the present invention will be described with reference to FIG. 9. The disconnection will begin with the generation of a Disconnect Release message from one of the public MSC and the handset depending on whether the caller or called party hangs up (such as pushing the end button, hanging up a conventional phone, etc.). The Disconnect Release message is passed between the handset and MSC, as shown in step 1151. A Release Complete message will then be generated by the receiving component and the release complete message will be acknowledged. The handset ends the three way handshake procedure by sending a Release Complete which is subsequently acknowledged in step 1153.

At this point the MM session and radio resources are still assigned by the BSC and a SCCP clear command is issued by the public MSC to the BSC to clear all resources associated with the connection, as shown in step 1155. This message is intercepted by Translation/Listening block 468, which proceeds in block 1156 to clear the SCCP connection between cPBX subsystem 452 and the public MSC. Once this is done, Translation/Listening block 468 sends a clear complete message in block 1157. Additionally, Translation/Listening block 468 needs to clear the SCCP connection between cPBX subsystem 452 and the BSC, e.g., BSC 172. Therefore, it sends out to BSC 172 a second SCCP clear command in block 1160 and receives the clear complete message therefrom in step 1162. The Clear command and Clear Complete may be piggybacked on the SCCP Release message in which case a SCCP Release Complete message is sent, thereby releasing the SCCP connection. In step 1159, the BSC sends a Channel Release message to the BTS to release the channel. The BTS sends back an acknowledgment and goes back into idle mode, as shown in steps 1161 and 1163 respectively.

Figure 10:
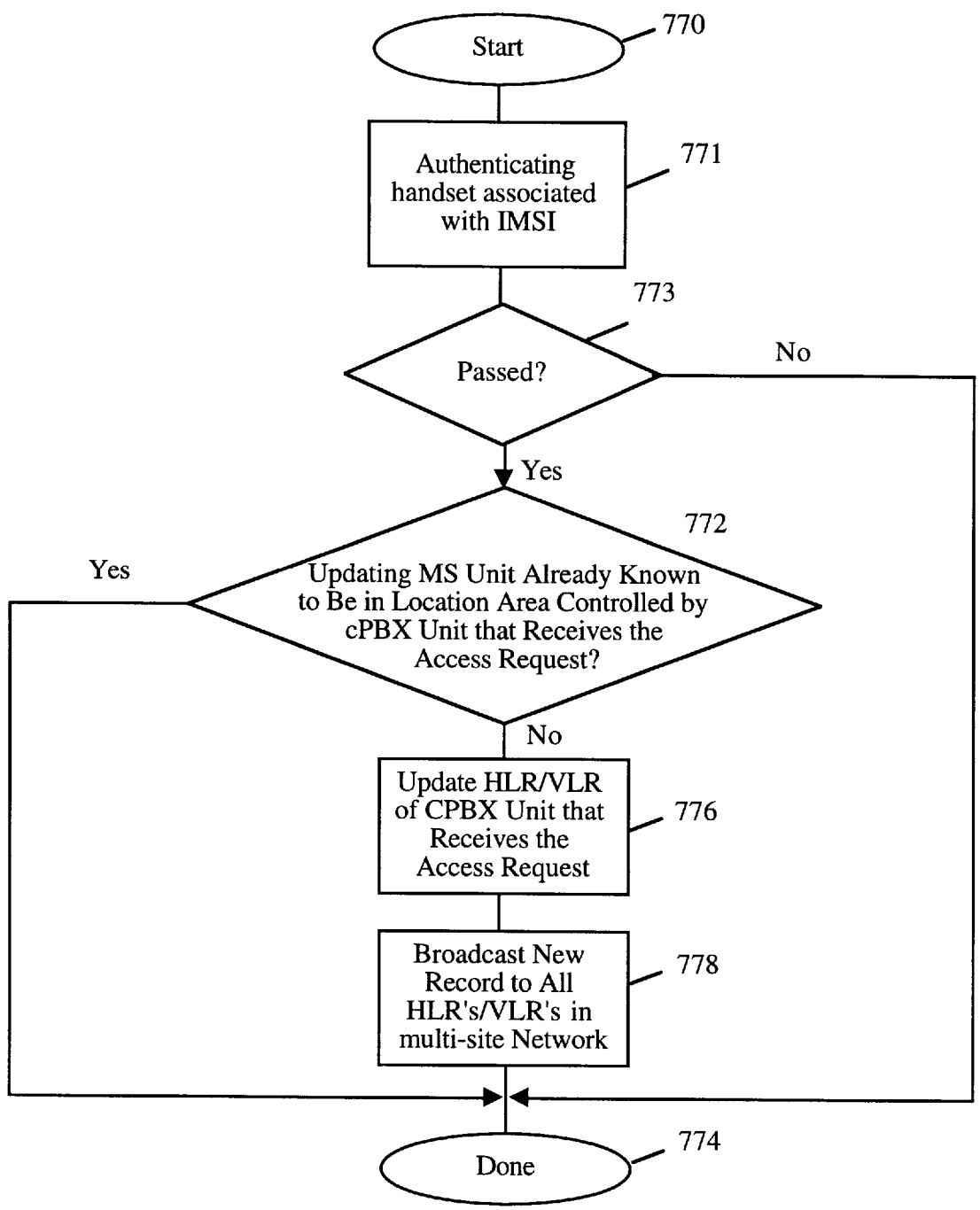
FIG. 10 is a flow diagram illustrating a method of handling a private location update request.

FIG. 10 is a flowchart illustrating, according to one embodiment, the updating of remote HLR's in a multi-site configuration. When the HLR is sent a process access request and the IMSI is found to found to belong to an MS unit that is considered native to the private network, the handset associated with that IMSI is authenticated in block 771 using standard techniques of authentication and challenge such as those found in the GSM specification. If authenticated (as ascertained in block 773), the method proceeds to block 772 wherein it is ascertained whether the authenticating MS unit is already known to be in the location area controlled by the cPBX unit that received the access request message. If the updating MS unit has not roamed from its last known location area, the remote HLR's do not need to be updated, and the method proceeds to block 774, wherein the steps of FIG. 10 end.

On the other hand, if the updating handset has roamed away from its last know location area (as determined in block 772), the method proceeds to block 776 to update its own registry. If the cPBX is connected to other cPBX's in a multi-site configuration, the method optionally proceeds to block 778 to broadcast the newly edited HLR/VLR record, reflecting the changed current location area of the updating handset, to all registries in the multi-site network so they can also update their registries. Note that it is not necessary in the stand-alone or stand-alone with a wired PBX adjunct configuration to broadcast the changed record to any other cPBX's (since there are none). From block 778, the method proceeds to block 774 where the connection is terminated as previously mentioned.

Figure 11:
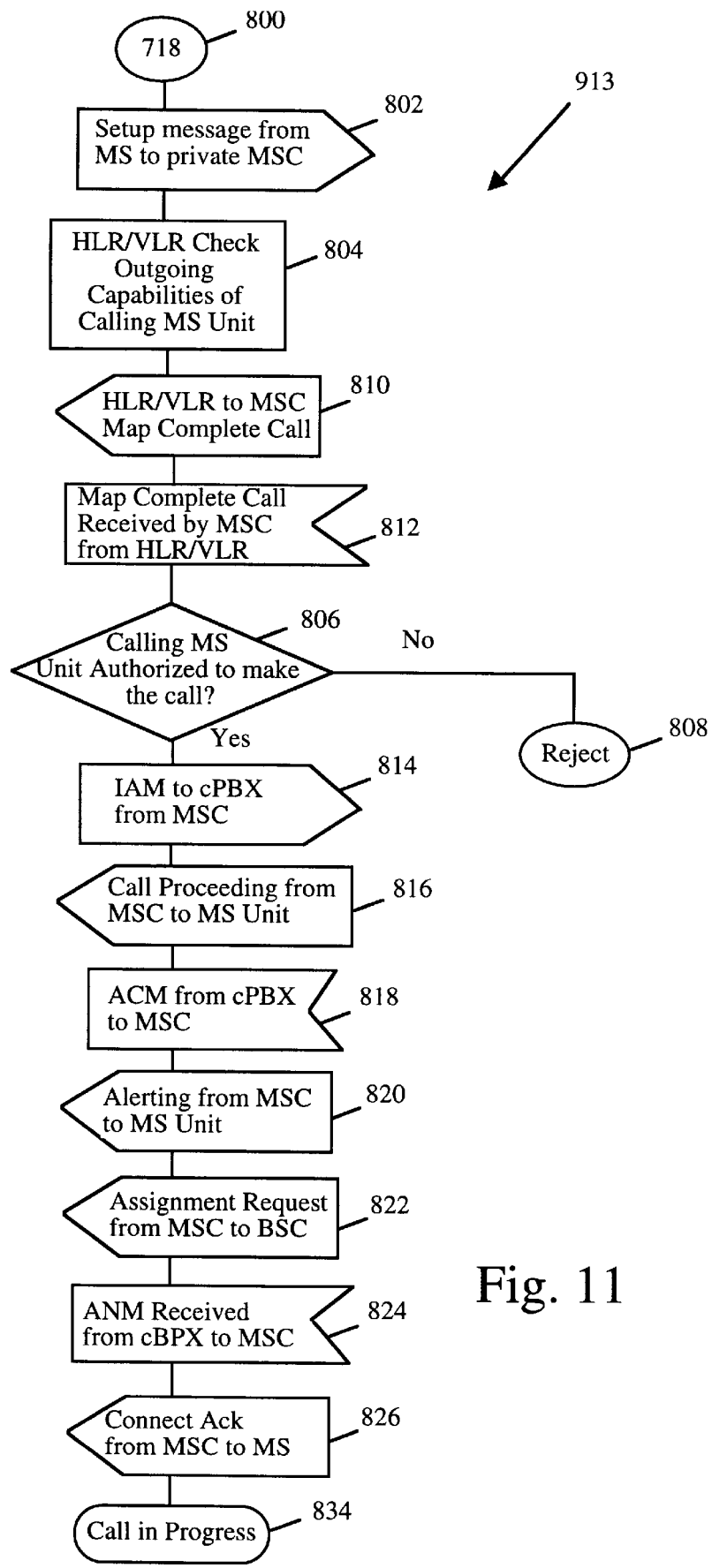
FIG. 11 is a flow diagram illustrating a method of handling a call originated from a native handset using the resources of the private MSC.

Referring next to FIG. 11 a process suitable for handling a call from a MS unit will be described. In step 802 the calling handset sends the private MSC (via the BTS and BSC) a setup message which typically includes, among others, the destination phone number and information indicating whether the call to be built is voice, data, fax, and the like. In block 804 the registry 324 associated with the private MSC that receives the set up message in block 802 validates whether the call attempted is permissible. By way of example, certain handsets, although authorized to use the private network resources, may be blocked from attempting to make calls to certain external areas, e.g., overseas or long distance.

The registry returns to the MSC its findings in the map complete message in block 810. The map complete message sent in step 810 is received by the private MSC from the registry in step 812. In step 806, it is ascertained whether the calling handset is authorized to make the call attempted. If not, the method proceeds to step 808 to reject the attempt and to clear the MM session. The call attempted is also rejected, in step 808, if the caller attempts to use a supplemental service (SS) that the calling handset has not subscribed to or is unavailable to the private cPBX network. After it is determined in step 806 that the call should be rejected, an SCCP clear message is preferably sent from the MSC to BSC to clear the MM session all the way to the handset. After the MM session is cleared, the BSC sends a clear complete message from the BSC to the MSC.

If the MS unit was authorized to place the call, the private MSC 254 sends the cPBX 452, in step 814, an initial address message (IAM) which, in the GSM implementation, includes the destination phone number to indicate its desire to connect to a particular destination phone. If intelligent switching is involved, it is the cPBX that decides the optimal cross-connect point, e.g., via BTS, BSC, cPBX or forwards the call to a wired PBX, a public network, or another cPBX.

In step 816 the private MSC 254 sends to the handset a call proceeding message responsive to a validation of the destination phone to indicate that the call is being processed. In step 818, private MSC 254 receives an address complete message (ACM) from the cPBX 452 which indicates that the entire destination number (the dialed number) has been received and that the call has been connected to its destination. The receipt of the ACM message by the private MSC also signifies a successful alerting on the called party, i.e., the destination phone is ringing. In step 820, the private MSC sends to the handset, responsive to the receipt of the ACM message received in step 818, an alerting message to the handset to inform the handset that the party called is being alerted and to turn on the ringer at the calling handset.

In step 822 the private MSC sends the BSC an assignment request message to assign channel for the bearer, e.g., the actual voice/data, channel on the A interface and to instruct the BSC to use the assigned channel to build the call. The assigned channel represents the channel on which the calling handset may send and receive its bearer data. It should be noted that the steps in step 822 may occur asynchronously with respect to the other steps of FIG. 11. In one embodiment, the private MSC sends the assignment request to the BSC right after the private MSC sends to the cPBX the IAM message (step 814). After the alerting message is received by the handset, the ringer circuit at the calling handset continues to ring until either the called party picks up the call or the caller hangs up, in which case the MM session is again cleared in the manner earlier discussed.

When the called party answers the call, cPBX block 452 alerts the private MSC 254 that the call can be completed by sending an ANM message. In step 824, the private MSC 254 receives the answer message (ANM). In step 826, the private MSC sends to the MS a connect message, to inform the MS unit that the call has been answered and that two-way voice or data communication may now commence. In step 834 both the calling and the called party are connected all the way through and the call is now in progress.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

APPENDIX A

Glossary of Terms and Abbreviations

Abis: Protocol stack between a BTS and a BSC
API: Application Programming Interface
BCF: Base Station Control Function
BSC: Base station Controller
BSS: Base Station Subsystem
BTS: Base Transceiver Station
CC: Call Control Management
CCPU: Cellular CPU
cPBX: cellular Private Branch Exchange
CILB: Configuration Independent Linkage Block
DSP: Digital Signal Processing
GMSC: Gateway for MSC
GSM: Global Systems for Mobile Communication
HLR: Home Location Registry
ISDN: Integrated Services Digital Network
LAPD-M: Link Access Protocol on the Dm (control) channel
LSC: Local Software Functional Block Communication
MM: Mobility Management
MS: Mobile Stations
MSC Mobile-Services Switching Center
PSTN: Public Switched Telephone Network
PBX: Private branch exchange
RF: module Radio Frequency module
RL: Radio Link
RR: Radio Resource Management
SCCP: Signalling Connection Control Part
SFB: Software Functional Block
SMS: Short Message Services
SS: Supplemental Services
TDM data: Time Division Multiplexed Data
TRAU: Transcoder-Rate Adapter Unit
TRX: Transceiver
VLR: Visitor Location Registry
VME: An industry standard bus for interconnecting components
wPBX: wired PBX

APPENDIX B

The present disclosure is written for ease of understanding by those of skill in the art. For others, the following documents, incorporated herein by reference for all purposes, may be reviewed for additional information.

Mouly, Michel & Pautet, Marie-Bernadette, "*The GSM System for Mobile Communications*", Mouly, Michel & Pautet, Marie-Bernadette, 1992.

European Telecommunications Standards Institute, "*European digital cellular telecommunications system (Phase 2): Mobile radio interface signaling layer 3 General aspects (GSM 04.07)*", 1994, Valbonne—France.

European Telecommunications Standards Institute, "*European digital telecommunications system (Phase 2): Mobile radio interface layer 3 specification (GSM 04.08)*", 1994, Valbonne—France.

European Telecommunications Standards Institute, "*European digital cellular telecommunications system (Phase 2); Mobile-services Switching Centre—Base Station System (MSC-BBS) interface Layer 3 specification (GSM 08.08)*", 1994, Valbonne—France.

European Telecommunications Standards Institute, "*European digital cellular telecommunications system (Phase 2): Signaling transport mechanism specification for the Base Station System—Mobile-services Switching Centre (BBS-MSC) interface (GSM 08.06)*", 1994, Valbonne—France.

European Telecommunications Standards Institute, "*European digital cellular telecommunications system (Phase 2); Base Station Controller—Base Transceiver Sta-*

*tion (BSC-BTS) interface Layer 3 specification (GSM 08.58)*", 1994, Valbonne—France.

European Telecommunications Standards Institute, "*European digital cellular telecommunications system (Phase 2); Mobile Application Part (MAP) specification (GSM 09.02)*", 1994, Valbonne—France.

European Telecommunications Standards Institute, "*European digital cellular telecommunications system (Phase 2): Signaling requirements on internetworking between the Integrated Services Digital Network (ISDN) or Public Switched Telephone Network (PSTN) and the Public Land Mobile Network (PLMN) (GSM 09.03)*", 1994, Valbonne—France.

What is claimed is:

1. A hybrid cellular communication apparatus in a hybrid cellular communication network, which has a base station subsystem and a switch circuit, for facilitating cellular communication for and among a plurality of native cellular handsets, said hybrid cellular communication network further facilitates cellular communication between a nonnative cellular handset and a public cellular network having a public mobile-services switching center, said nonnative cellular handset being a cellular handset that does not subscribe to said hybrid cellular communication network, comprising:

a cellular exchange subsystem coupled to said base station subsystem and said public cellular network, including:

a private mobile-services switching center coupled to said switch circuit for providing mobility management for said plurality of native cellular handsets, said switch circuit representing a node wherein a bearer data channel from any of said plurality of native cellular handsets may be cross-connected to complete a call path within said hybrid communication network;

a registry coupled to said private mobile-services switching center, said registry containing data identifying each of said plurality of native cellular handsets as handsets that subscribe to said hybrid cellular communication network, wherein said nonnative handset is not identified in said registry as a handset that subscribes to said hybrid cellular communication network;

a hybrid base station controller circuit coupled to said public cellular network; and a circuit coupled to said registry for determining, responsive to data in said registry, whether communication data pertaining to a call received by said cellular exchange subsystem originates from one of said plurality of native cellular handsets or from said nonnative cellular handset, said circuit passing said communication data to said private mobile-services switching center to facilitate completion of a call path within said hybrid cellular communication network if said circuit determines that said communication data originates from one of said native cellular handsets, said circuit passing said communication data to said hybrid base station controller to facilitate communication with said public cellular network, irrespective whether said communication data pertains to a call to one of said native cellular handsets, to facilitate completion of a call path to said nonnative cellular handset using mobile-services switching center resources of said mobile-services switching center in said public cellular network if said circuit determines that said communication data originates from said nonnative cellular handset, wherein said hybrid base station controller functions to forward and translate communication data between said public cellular network and said base station subsystem within said hybrid cellular communication network.

2. The hybrid cellular communication network of claim 1 wherein said nonnative cellular handset is a cellular handset implementing the GSM protocol.

3. The hybrid cellular communication network of claim 2 wherein each of said plurality of native cellular handsets implements said GSM protocol.

4. The hybrid cellular communication network of claim 1 wherein calls between any two of said plurality of native cellular handsets are TRAUed only if they communicate at different rates.

5. The hybrid cellular communication network of claim 1 further comprising a base station controller coupled to said mobile switching center, said base station controller representing a node for cross-connecting calls between any two of said plurality of native cellular handsets that are both currently within a domain of said base station controller.

6. The hybrid cellular communication network of claim 5 further comprising a base transmitter station coupled to said base station controller, said base transmitter station representing a node for cross-connecting calls between any two of said plurality of native cellular handsets that are both currently within a domain of said base transmitter station.

7. The hybrid cellular communication network of claim 2 wherein said circuit passes said communication data from said nonnative cellular handset to said public cellular network for completing said call path only if a completion of said call path does not result in exceeding resources of said hybrid cellular communication network allocated to nonnative cellular handset usage.

8. The hybrid cellular communication network of claim 1 wherein a call path between said one of said native cellular handsets and a telephone controlled by a wired private branch exchange, which is coupled to said hybrid cellular communication network, may be completed through said private switch without using resources of said public cellular network if said circuit determines that said communication data originates from one of said native cellular handsets and destined for said telephone controlled by said wired private branch exchange.

9. The hybrid cellular communication apparatus of claim 1 wherein said cellular exchange subsystem is further coupled to another substantially similar cellular exchange subsystem, thereby forming an overlay network within said hybrid cellular communication network, call paths between a first native cellular handset and a second native cellular handset that both subscribe to said hybrid cellular communication network may be completed without using resources of said public cellular network irrespective of which cellular communication subsystem said first native cellular handset and said second native cellular handset are in communication with.

10. The hybrid cellular communication network of claim 1 wherein a call path between said one of said native cellular handsets and a telephone controlled by a public network, which is coupled to said hybrid cellular communication network, may be completed through said switch circuit without using resources of said public cellular network if said circuit determines that said communication data originates from one of said native cellular handsets and destined for said telephone controlled by said public network.

11. The hybrid cellular communication network of claim 8 wherein a call path between said one of said native cellular handsets and a telephone controlled by a public network, which is coupled to said hybrid cellular communication network, may be completed through said switch circuit without using resources of said public cellular network if said circuit determines that said communication data originates from one of said native cellular handsets and destined for said telephone controlled by said public network.

12. The hybrid cellular communication apparatus of claim 11 wherein said cellular exchange subsystem is further coupled to another substantially similar cellular exchange subsystem, thereby forming an overlay network within said hybrid cellular communication network, call paths between a first native cellular handset and a second native cellular handset that both subscribe to said hybrid cellular communication network may be completed without using resources of said public cellular network irrespective of which cellular communication subsystem said first native cellular handset and said second native cellular handset are in communication with.

13. The hybrid cellular communication network of claim 2 wherein said communication data is an access request.

14. In a hybrid cellular communication network having a cellular exchange subsystem and a private mobile-services switching center, said cellular exchange subsystem being coupled to a public cellular network, a method for facilitating cellular communication for and among a plurality of native cellular handsets, said native cellular handsets being handsets that subscribe to said hybrid cellular communication network, said hybrid cellular communication network further facilitates cellular communication between a nonnative cellular handset and said public cellular network, said nonnative cellular handset being a cellular handset that does not subscribe to said hybrid cellular communication network, when said nonnative cellular handset is within a domain of said hybrid cellular communication network, comprising:

receiving access request data, using a cellular exchange subsystem;

ascertaining whether said access request data originates from one of said plurality of native cellular handsets or from said nonnative cellular handset;

if said access request data originates from said one of said plurality of native cellular handsets, passing data relating to said access request to said private mobile-services switching center for completing a first call path from said one of said plurality of native cellular handsets; and if said access request data originates from said nonnative cellular handset, passing data relating to said access request data to said public cellular network for completing a second call path between said nonnative cellular handset and said public cellular network.

15. The method of claim 14 further comprising the steps of:

if said access request data originates from said one of said plurality of native cellular handsets, receiving a destination phone number from said one of said plurality of native cellular handsets;

if said destination phone number is associated with another one of said plurality of native cellular handsets, completing said first call path between said one of said plurality of native cellular handsets and said another one of said plurality of native cellular handsets without using resources of said public cellular network; and if said destination phone number is not associated with a cellular handset that subscribes to said hybrid cellular communication network, completing said first call path between said one of said plurality of native cellular handsets and a public network.

16. The method of claim 14 wherein said ascertaining step further comprises:

extracting a handset identifier from said access request data; and comparing said handset identifier against records in a registry associated with said cellular exchange subsystem.

17. The method of claim 14 wherein said data related to said access request data originating from said nonnative cellular handset is passed to said public cellular network for completing said second call path between said nonnative cellular handset and said public cellular network only if completing said second call path does not result in exceeding resources of said hybrid cellular communication network allocated to nonnative cellular handset usage.

18. The method of claim 14 wherein said data related to said access request data is translated to conform to GSM standard access request data prior to being passed to said public network.

19. A hybrid cellular communication apparatus in a hybrid cellular communication network having a cellular exchange subsystem and a private mobile-services switching center, said cellular exchange subsystem being coupled to a public cellular network, said apparatus facilitates cellular communication for and among a plurality of native cellular handsets, said native cellular handsets being handsets that subscribe to said hybrid cellular communication network, said hybrid cellular communication apparatus further facilitates cellular communication between a normative cellular handset and said public cellular network, said nonnative cellular handset being a cellular handset that does not subscribe to said hybrid cellular communication network, when said nonnative cellular handset is within a domain of said hybrid cellular communication network, comprising:

means for receiving access request data, using a cellular exchange subsystem;

means, coupled to said receiving means, for ascertaining whether said access request data originates from one of said plurality of native cellular handsets or from said normative cellular handset;

means, responsive to said ascertaining means, for passing data relating to said access request to said private mobile-services switching center for completing a first call path from said one of said plurality of native cellular handsets if said access request data originates from said one of said plurality of native cellular handset; and means, responsive to said ascertaining means, for passing data relating to said access request data to said public cellular network for completing a second call path between said normative cellular handset and said public cellular network if said access request data originates from said normative cellular handset.

20. The apparatus of claim 19 further comprising the steps of:

means for receiving a destination phone number from said one of said plurality of native cellular handsets if said access request data originates from said one of said plurality of native cellular handsets;

means for completing said first call path between said one of said plurality of native cellular handsets and said another one of said plurality of native cellular handsets without using resources of said public cellular network if said destination phone number is associated with another one of said plurality of native cellular handsets; and means for completing said first call path between said one of said plurality of native cellular handsets and a public network if said destination phone number is not associated with a cellular handset that subscribes to said hybrid cellular communication network.

21. The method of claim 19 wherein said ascertaining means further comprises:

means for extracting a handset identifier from said access request data; and means for comparing said handset identifier against records in a registry associated with said cellular exchange subsystem.

\* \* \* \* \*